(12) United States Patent
Kudo

(10) Patent No.: US 7,006,160 B2
(45) Date of Patent: Feb. 28, 2006

(54) TELEVISION SIGNAL TRANSMITTER ATTENUATING UNWANTED SIGNAL WHILE MAINTAINING MATCH BETWEEN CIRCUITS

(75) Inventor: Yasuharu Kudo, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 690 days.

(21) Appl. No.: 09/826,669

(22) Filed: Apr. 5, 2001

(65) Prior Publication Data
US 2001/0040643 A1 Nov. 15, 2001

(30) Foreign Application Priority Data
Apr. 13, 2000 (JP) .................................. 2000-117215

(51) Int. Cl.
H04N 5/38 (2006.01)

(52) U.S. Cl. ..................... 348/723; 348/724; 348/731
(58) Field of Classification Search ............... 348/723, 348/724, 731; 455/180.1; H04N 5/38, 5/40, H04N 5/50
See application file for complete search history.

(56) References Cited

U.S. PATENT DOCUMENTS

| 4,434,440 A | * | 2/1984 | Schiff | 348/723 |
| 4,564,858 A | * | 1/1986 | Resch | 348/723 |
| 5,051,711 A | * | 9/1991 | Jones | 333/188 |
| 5,507,025 A | * | 4/1996 | Rodeffer | 455/266 |
| 5,525,906 A | * | 6/1996 | Crawford et al. | 324/322 |
| 5,528,633 A | * | 6/1996 | Halik et al. | 375/326 |
| 5,963,842 A |   | 10/1999 | Kinugawa | |
| 5,995,169 A | * | 11/1999 | Hatano | 348/726 |
| 6,418,162 B1 | * | 7/2002 | Yau et al. | 375/224 |
| 6,573,949 B1 | * | 6/2003 | Yamamoto | 348/731 |

FOREIGN PATENT DOCUMENTS

JP   HEI 7-38384   2/1995

* cited by examiner

Primary Examiner—Michael H. Lee
Assistant Examiner—Trang U. Tran
(74) Attorney, Agent, or Firm—Brinks Hofer Gilson & Lione

(57) ABSTRACT

A signal transmitter prevented from outputting an unwanted signal to the outside, which is generated at the time of changing any of various setting parameters such as a channel through which a signal is to be transmitted and the degree of modulation of an intermediate frequency signal to be supplied without deteriorating impedance matching between circuits. This signal transmitter has a local oscillator for outputting a local oscillation signal; a mixer for mixing a supplied television intermediate frequency signal with the local oscillation signal and frequency-converting the resultant signal to a television signal of a specific channel through which the signal is to be transmitted among television channels; and a variable band-pass filter connected at a post stage of the mixer and tuned to the frequency of the specific channel. The tuning frequency of the variable band-pass filter can be shifted out of the frequency band of the specific channel.

9 Claims, 2 Drawing Sheets

TELEVISION SIGNAL TRANSMITTER ATTENUATING UNWANTED SIGNAL WHILE MAINTAINING MATCH BETWEEN CIRCUITS

BACKGROUND OF THE INVENTION

1. Field of the Invention

The present invention relates to a television signal transmitter used for a CATV system or the like.

2. Description of the Related Art

A television signal transmitter has the function of converting the frequency of a television intermediate frequency signal to the frequency of a channel to which the signal is transmitted. As shown in FIG. 4, a conventional television signal transmitter has an intermediate frequency (IF) amplifier 51, a mixer 52, a local oscillator 53, a radio-frequency (RF) band-pass filter 54, a radio-frequency (RF) amplifier 55, a radio-frequency (RF) relay 56, and the like.

A television intermediate frequency (IF) signal outputted from a modulator (not shown) is supplied to the IF amplifier 51. A video intermediate frequency and a sound intermediate frequency of the IF signal are, for example, 45.75 MHz and 41.25 MHz, respectively, according to U.S. specifications. The IF signal amplified by the IF amplifier 51 is supplied to the mixer 52.

A local oscillation signal outputted from the local oscillator 53 is supplied to the mixer 52. The local oscillator 53 takes the form of a voltage-controlled oscillator having therein a varactor diode, and its oscillation frequency is changed by a control voltage applied to the varactor diode. The IF signal is frequency-mixed with the local oscillation signal and frequency-converted to a television signal (RF signal) of a channel through which the signal is to be transmitted. The frequency of the RF signal lies in the range from 55 MHz to 860 MHz, and the frequency of the local oscillation signal is set in correspondence with the frequency of the RF signal. The local oscillation frequency is higher than the frequency of the RF signal only by the frequency of the IF signal.

The RF signal is supplied to the RF amplifier 55 via the RF band-pass filter 54. The RF band-pass filter 54 is constructed by three band-pass filters 54a to 54c each taking the form of a double-tuned circuit having a varactor diode. The RF band-pass filter 54 is controlled so as to be tuned in the frequency band of the RF signal. The RF signal passed through the RF band-pass filter 54 is amplified by the RF amplifier 55, outputted via the RF relay 56, and supplied to a distributer, a mixer, and the like (not shown) at the next stage.

Data for setting the local oscillation frequency of the local oscillator 53 and the tuning frequency of the band-pass filter 54 is stored in a memory (ROM) 57. Data read by an MPU 58 is converted by a D/A converter 59 to an analog voltage which is applied to the varactor diode in the local oscillator 53 and the varactor diode in the band-pass filter 54.

In the above configuration, for example, when changing the frequency of the RF signal and/or the degree of modulation of the IF signal, there is the possibility that an unwanted signal generated by the change is outputted and negatively impacts other devices. Consequently, it is necessary to prevent the generation of these unwanted signals. By operating the RF relay 56 at the time of such a change so as to be switched off, the RF signal is not outputted.

When the RF relay 56 is switched off, however, since the circuit is disconnected, the impedance of the circuit is not matched to that at the output terminal of the RF amplifier 55. Problems such as unstable operation in the amplifier due to reflection and occurrence of a loss at an output terminal of the amplifier due to an impedance mismatch occurs.

SUMMARY OF THE INVENTION

An object of the invention is therefore to provide a television signal transmitter prevented from outputting an unwanted signal generated at the time of a change in any of various setting parameters such as the frequency of an RF signal and the degree of modulation of an IF signal without deteriorating impedance matching between circuits.

According to the invention, there is provided a television signal transmitter comprising: a local oscillator for outputting a local oscillation signal; a mixer for mixing a supplied television intermediate frequency signal with the local oscillation signal and frequency-converting a resultant signal to a television signal of a specific channel through which the signal is to be transmitted among television channels; and a variable band-pass filter connected at a post stage of the mixer and tuned to a frequency of the specific channel, wherein a tuning frequency of the variable band-pass filter can be shifted to a frequency out of a frequency band of the specific channel.

The variable band-pass filter is tuned in a range from a first frequency to a second frequency, the specific channel is set between the first frequency and the second frequency, and a frequency out of the band is lower than the first frequency or is higher than the second frequency.

When the frequency of the specific channel is higher than a middle frequency between the first and second frequencies, the frequency out of the band is set to be equal to or lower than the first frequency, and when the frequency of the specific channel is lower than the middle frequency, the frequency out of the band is set to be equal to or higher than the second frequency.

The local oscillator is provided with a first varactor diode for changing the frequency of the local oscillation signal, the variable band-pass filter is provided with a second varactor diode for changing the tuning frequency, the television signal transmitter further comprises: a memory in which data for setting the frequency of the local oscillation signal and the tuning frequency is stored; a D/A converter for converting the data into a d.c. voltage; a first external power source; voltage adding means to which the d.c. voltage is supplied; and first switching means, the d.c. voltage is applied to the first varactor diode, a voltage outputted from the voltage adding means is applied to the second varactor diode, and the voltage of the first external power source is enabled to be applied to the voltage adding means by the first switching means.

The local oscillator is provided with a first varactor diode for changing the frequency of the local oscillation signal, the variable band-pass filter is provided with a second varactor diode for changing the tuning frequency, the television signal transmitter further comprises: a memory in which data for setting the frequency of the local oscillation signal and the tuning frequency is stored; a D/A converter for converting the data into a d.c. voltage; a second external power source; a third external power source; and second switching means, the d.c. voltage is applied to the first varactor diode, and one of the d.c. voltage, a voltage of the second external power source, and a voltage of the third external power source can be applied to the second varactor diode by the second switching means.

DESCRIPTION OF THE PREFERRED EMBODIMENTS

Figure 1:
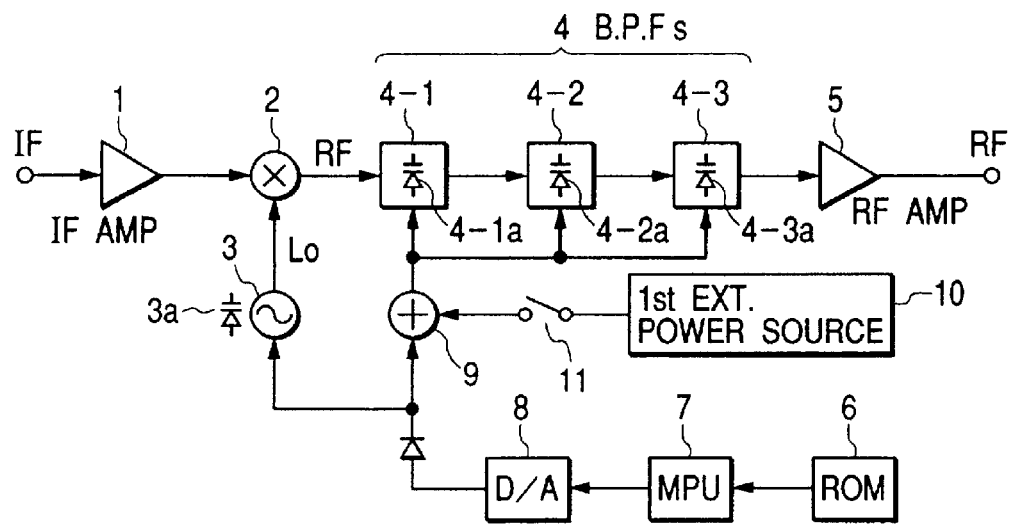
FIG. 1 is a circuit diagram showing a television signal transmitter according to a first embodiment of the invention.
Figure 2:
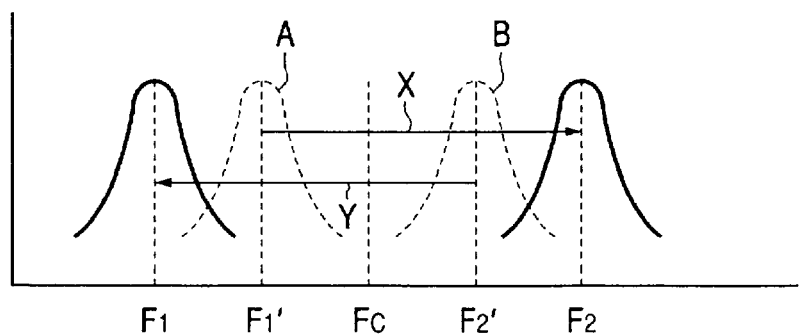
FIG. 2 is a diagram for explaining operations of the television signal transmitter of the invention.

Referring to FIGS. 1 and 2, a television signal transmitter according to a first embodiment of the invention will be described. The television signal transmitter according to the invention has, as shown in FIG. 1, an intermediate frequency (IF) amplifier 1, a mixer 2, a local oscillator 3, a radio frequency (RF) band-pass filter 4, a radio frequency (RF) amplifier 5, a memory (ROM) 6, a control unit (MPU) 7, a D/A converter 8, an adder 9, a first external power source 10, a first switching means 11, and the like.

A television intermediate frequency (IF) signal outputted from a modulator (not shown) is supplied to the IF amplifier 1. A video intermediate frequency and a sound intermediate frequency of the signal are, for example, 45.75 MHz and 41.25 MHz, respectively, in U.S. specifications. The IF signal amplified by the IF amplifier 1 is supplied to the mixer 2.

A local oscillation signal Lo outputted from the local oscillator 3 is supplied to the mixer 2. The local oscillator 3 takes the form of a voltage-controlled oscillator having therein a first varactor diode 3a, and its oscillation frequency is changed by a control voltage Vt applied to the first varactor diode 3a. The IF signal is frequency-mixed with the local oscillation signal and is frequency-converted to a television signal (RF signal) of a specific channel among ordinary channels through which the signal is to be transmitted.

The frequency of the RF signal is selected from the range from 50 MHz to 860 MHz, and the frequency of the local oscillation signal is set in correspondence with the frequency of the RF signal. For example, in the case of a television signal of channel 2 in U.S. specifications, since a video carrier frequency is 55.25 MHz and a sound carrier frequency is 59.75 MHz, the local oscillation frequency is set to be 101 MHz. That is, the local oscillation frequency is set so as to be always higher than the frequency of a channel through which a signal is to be sent only by the video intermediate frequency (45.75 MHz).

The RF signal is supplied to the RF amplifier 5 via the variable band-pass filter 4. The variable band-pass filter 4 is constructed by three band-pass filters 4-1 to 4-3 taking the form of double-tuned circuits of the same configuration having second varactor diodes 4-1a to 4-3a. By a control voltage applied to the second varactor diodes 4-1a to 4-3a, as shown in FIG. 2, the tuning frequency changes in a range of a first frequency (F1 in FIG. 2) and a second frequency (F2 in FIG. 2). A specific channel is set so as to be in the range from the first frequency to the second frequency. The passband of each of the band-pass filters 4-1 to 4-3 is about 6 MHz.

The RF signal passed through the variable band-pass filter 4 is amplified by the RF amplifier 5 to a desired level, and a resultant signal is supplied to a mixer and the like (not shown) at the next stage.

Data for setting the local oscillation frequency of the local oscillator 3 and the tuning frequency of the variable band-pass filter 4 (that is, digital data for setting a channel through which a signal is to be transmitted) is stored in the memory (ROM) 6. Data read by the MPU 7 is converted by the D/A converter 8 to an analog d.c. voltage. The d.c. voltage is applied as the control voltage Vt to the first varactor diode 3a in the local oscillator 3. The control voltage is also applied to the second varactor diodes 4-1a to 4-3a in the band-pass filters 4-1 to 4-3.

Since the voltage of the first external power source 10 is supplied to the adder 9 by the first switching means 11, when the first switching means 11 is in a closed state, a voltage obtained by adding the voltage of the first external power source 10 to the control voltage Vt is applied to the second varactor diodes 4-1a to 4-3a of the band-pass filters 4-1 to 4-3. The voltage value of the first external power source 10 can be variously changed. The changing range of the voltage obtained by the addition is wider than that of the control voltage. Specifically, the voltage obtained by the addition ranges from a voltage (for example, 1 volt) lower than the minimum value (for example, 4 volts) of the control voltage outputted from the D/A converter 8 to a voltage (for example, 20 volts) higher than the maximum value (for example, 17 volts) of the control voltage.

In the configuration, for example, in a state where the frequency of an RF signal is set by the control voltage so as to be F1' (frequency lower than a middle frequency Fc of the first and second frequencies F1 and F2), the tuning frequency of each of the band-pass filters 4-1 to 4-3 is F1' as shown by reference character A in FIG. 2. When the first switching means 11 is closed in such a state to change the degree of modulation of the IF signal, a voltage (20 volts) obtained by adding the voltage of the first external power source 10 to the control voltage is applied to each of the band-pass filters 4-1 to 4-3. The tuning frequency of each of the band-pass filters 4-1 to 4-3 shifts to a higher value (as shown by the arrow X) and is set to be, for example, a frequency higher than the second frequency F2.

Even if an unwanted signal occurs in the vicinity of the frequency F1' of the RF signal in association with a change in the degree of modulation of the IF signal in such a state, since the tuning frequency of each of the band-pass filters 4-1 to 4-3 has shifted to a higher value, an unwanted signal attenuates more than 65 dB due to selectivity characteristics and is hardly outputted from the RF amplifier 5.

For example, in a state where the frequency of the RF signal is set by the control voltage so as to be F2' (frequency higher than the middle frequency Fc), the tuning frequency of each of the band-pass filters 4-1 to 4-3 is F2' as shown by reference character A in FIG. 2. When the first switching means 11 is closed to change the degree of modulation of the IF signal in such a state, a voltage obtained by adding the voltage of the first external power source 10 to the control voltage is applied to each of the band-pass filters 4-1 to 4-3. By setting the voltage of the first external power source 10 in this case to a negative value, a voltage (1 volt) lower than the control voltage is applied to each of the band-pass filters 4-1 to 4-3. Consequently, the tuning frequency shifts to a lower value (as shown by the arrow Y) and is set to, for example, a frequency lower than the first frequency F1. In this case as well, therefore, an unwanted signal generated in association with a change in the degree of modulation attenuates.

Figure 3:
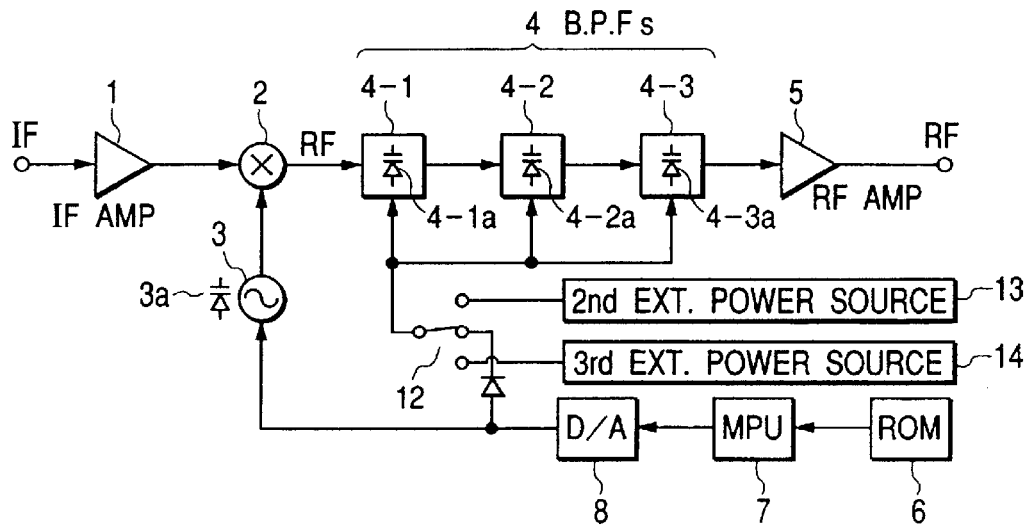
FIG. 3 is a circuit diagram showing a television signal transmitter according to a second embodiment of the invention.
Figure 4:
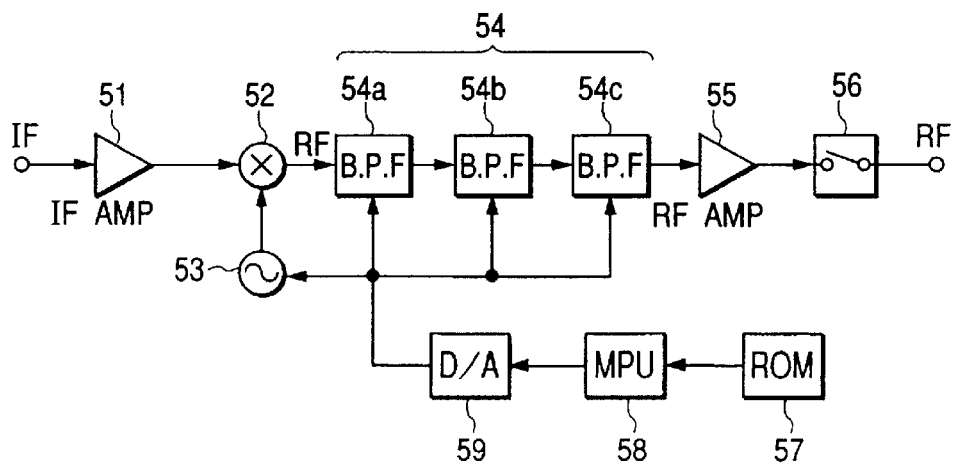
FIG. 4 is a circuit diagram showing the configuration of a conventional television signal transmitter.

FIG. 3 shows a television signal transmitter according to a second embodiment of the invention. A control voltage outputted from the D/A converter 8 is applied to the local oscillator 3. To each of the band-pass filters 4-1 to 4-3, one of a control voltage outputted from the D/A converter 8, the voltage of a second external power source 13, and the voltage of a third external power source 14 is applied by second switching means 12. The voltage of the second external power source 13 is a voltage (1 volt) which sets the tuning frequency of each of the band-pass filters 4-1 to 4-3 to be lower than the first frequency F1. The voltage of the third external power source 14 is a voltage (20 volts) which sets the tuning frequency of each of the band-pass filters 4-1 to 4-3 to a voltage higher than the second frequency F2.

In normal times, the control voltage outputted from the D/A converter 8 is applied by the second switching means 12. In the case of, for example, changing the degree of modulation of the IF signal as described above, the voltage of either the second external power source 13 or the third external power source 14 is applied to each of the band-pass filters 4-1 to 4-3 by the second switching means 12. In this case as well, when the frequency of the RF signal is lower than the intermediate frequency Fc, a high voltage (20 volts) is applied from the external power source 14. When the frequency of the RF signal is higher than the middle frequency Fc, a low voltage (1 volt) is applied from the external power source 13.

The tuning frequency of the variable band-pass filter 4 shifts to a frequency either lower than the first frequency F1 or higher than the second frequency F2, so that an unwanted signal generated in association with a change in the degree of modulation attenuates.

As described above, the supplied television intermediate frequency signal is frequency-converted to a television signal of a specific channel through which the signal is to be transmitted among television channels, and; the tuning frequency of the variable band-pass filter tuned to the frequency of the specific channel can be shifted to a frequency out of a frequency band of the specific channel. Consequently, for example, an unwanted signal generated in association with a change in the degree of modulation of the IF signal attenuates due to selectivity characteristics of the variable band-pass filter and is hardly outputted to the post stage. Moreover, the impedance matching between circuits does not largely deteriorate. Thus, the amplifier operates stably. Since reflection is little, a loss which causes a problem does not occur.

The variable band-pass filter is tuned in a range from a first frequency to a second frequency, the specific channel is set between the first frequency and the second frequency, and a frequency out of the band is lower than the first frequency or is higher than the second frequency. Consequently, an unwanted signal attenuates largely.

When the frequency of the specific channel is higher than a middle frequency between the first and second frequencies, the frequency out of the band is set to be equal to or lower than the first frequency, and when the frequency of the specific channel is lower than the middle frequency, the frequency out of the band is set to be equal to or higher than the second frequency. Consequently, the difference between the frequency of the specific channel and the frequency after the shift becomes large, and an unwanted signal attenuates more largely.

The television signal transmitter further comprises: a memory in which data for setting the frequency of the local oscillation signal and the tuning frequency is stored; a D/A converter for converting the data into a d.c. voltage; a first external power source; voltage adding means to which the d.c. voltage is supplied; and first switching means, the d.c. voltage is applied to a varactor diode of the local oscillator, a voltage outputted from the voltage adding means is applied to a varactor diode of the variable band-pass filter, and the voltage of the first external power source can be applied to the voltage adding means by the first switching means. The tuning frequency of the variable band-pass filter can be therefore shifted out of the frequency band of the specific channel. The tuning frequency of the variable band-pass filter can be set to be equal to or lower than the first frequency or equal to or higher than the second frequency by setting the voltage of the first external power source.

The television signal transmitter further comprises: a memory in which data for setting the frequency of the local oscillation signal and the tuning frequency is stored; a D/A converter for converting the data into a d.c. voltage; a second external power source; a third external power source; and second switching means, the d.c. voltage is applied to a varactor diode of the local oscillator, and one of the d.c. voltage, a voltage of the second external power source, and a voltage of the third external power source can be applied to a varactor diode of the variable band-pass filter by the second switching means. By the setting of the voltage of the second external power source and the voltage of the third external power source, irrespective of the d.c. voltage, the tuning frequency of the variable band-pass filter can be set to be equal to or lower than the first frequency or equal to or higher than the second frequency.

What is claimed is:

1. A television signal transmitter comprising:
   a local oscillator that outputs a local oscillation signal;
   a mixer that mixes a supplied television intermediate frequency signal with the local oscillation signal and frequency-converts a resultant signal to a television signal of a specific channel through which the signal is to be transmitted among television channels; and
   a variable band-pass filter connected at a post stage of the mixer and tuned to a frequency of the specific channel,
   wherein a tuning frequency of the variable band-pass filter can be shifted to a frequency out of a frequency band of the specific channel, and
   wherein when a transmission state of the television signal is changed, the tuning frequency of the variable band-pass filter is shifted to a frequency out of the frequency band of the specific channel.

2. A television signal transmitter according to claim 1, wherein the variable band-pass filter is tuned in a range from a first frequency to a second frequency, the specific channel is set between the first frequency and the second frequency, and the frequency out of the band is lower than the first frequency or is higher than the second frequency.

3. A television signal transmitter according to claim 2, wherein when the frequency of the specific channel is higher than a middle frequency between the first and second frequencies, the frequency out of the band is set to be equal to or lower than the first frequency, and when the frequency of the specific channel is lower than the middle frequency, the frequency out of the band is set to be equal to or higher than the second frequency.

4. A television signal transmitter comprising:
   a local oscillator that outputs a local oscillation signal;
   a mixer that mixes a supplied television intermediate frequency signal with the local oscillation signal and frequency-converts a resultant signal to a television signal of a specific channel through which the signal is to be transmitted among television channels; and
   a variable band-pass filter connected at a post stage of the mixer and tuned to a frequency of the specific channel, wherein a tuning frequency of the variable band-pass filter can be shifted to a frequency out of a frequency band of the specific channel, wherein the local oscillator is provided with a first varactor diode for changing the frequency of the local oscillation signal, the variable band-pass filter is provided with a second varactor diode for changing the tuning frequency, the television signal transmitter further comprises: a memory in which data for setting the frequency of the local oscillation signal and the tuning frequency is stored; a D/A converter that converts the data into a d.c. voltage; a first external power source; voltage adding means to which the d.c. voltage is supplied; and first switching means, the d.c. voltage is applied to the first varactor diode, a voltage outputted from the voltage adding means is applied to the second varactor diode, and the voltage of the first external power source is enabled to be applied to the voltage adding means by the first switching means.

5. A television signal transmitter according to claim 4, wherein the variable band-pass filter is tuned in a range from a first frequency to a second frequency, the specific channel is set between the first frequency and the second frequency, and the frequency out of the band is lower than the first frequency or is higher than the second frequency.

6. A television signal transmitter according to claim 5, wherein when the frequency of the specific channel is higher than a middle frequency between the first and second frequencies, the frequency out of the band is set to be equal to or lower than the first frequency, and when the frequency of the specific channel is lower than the middle frequency, the frequency out of the band is set to be equal to or higher than the second frequency.

7. A television signal transmitter comprising:

a local oscillator that outputs a local oscillation signal;

a mixer that mixes a supplied television intermediate frequency signal with the local oscillation signal and frequency-converts a resultant signal to a television signal of a specific channel through which the signal is to be transmitted among television channels; and a variable band-pass filter connected at a post stage of the mixer and tuned to a frequency of the specific channel, wherein a tuning frequency of the variable band-pass filter can be shifted to a frequency out of a frequency band of the specific channel, wherein the local oscillator is provided with a first varactor diode for changing the frequency of the local oscillation signal, the variable band-pass filter is provided with a second varactor diode for changing the tuning frequency, the television signal transmitter further comprises: a memory in which data for setting the frequency of the local oscillation signal and the tuning frequency is stored; a D/A converter that converts the data into a d.c. voltage; a second external power source; a third external power source; and second switching means, the d.c. voltage is applied to the first varactor diode, and one of the d.c. voltage, a voltage of the second external power source, and a voltage of the third external power source can be applied to the second varactor diode by the second switching means.

8. A television signal transmitter according to claim 7, wherein the variable band-pass filter is tuned in a range from a first frequency to a second frequency, the specific channel is set between the first frequency and the second frequency, and the frequency out of the band is lower than the first frequency or is higher than the second frequency.

9. A television signal transmitter according to claim 8, wherein when the frequency of the specific channel is higher than a middle frequency between the first and second frequencies, the frequency out of the band is set to be equal to or lower than the first frequency, and when the frequency of the specific channel is lower than the middle frequency, the frequency out of the band is set to be equal to or higher than the second frequency.

* * * * *